(12) United States Patent
Jeong

(10) Patent No.: US 12,105,232 B2
(45) Date of Patent: Oct. 1, 2024

(54) APPARATUS FOR FUSING DUAL PARTICLE IMAGES ON BASIS OF CODED APERTURE

(71) Applicant: JEJU NATIONAL UNIVERSITY INDUSTRY ACADEMIC COORPERATION FOUNDATION, Jeju-si (KR)

(72) Inventor: Man Hee Jeong, Jeju-si (KR)

(73) Assignee: JEJU NATIONAL UNIVERSITY INDUSTRY ACADEMIC COORPERATION FOUNDATION, Jeju-si (KR)

( * ) Notice: Subject to any disclaimer, the term of this patent is extended or adjusted under 35 U.S.C. 154(b) by 33 days.

(21) Appl. No.: 18/015,121

(22) PCT Filed: Feb. 26, 2021

(86) PCT No.: PCT/KR2021/002487
§ 371 (c)(1),
(2) Date: Jan. 9, 2023

(87) PCT Pub. No.: WO2022/010065
PCT Pub. Date: Jan. 13, 2022

(65) Prior Publication Data
US 2023/0273331 A1 Aug. 31, 2023

(30) Foreign Application Priority Data

Jul. 7, 2020 (KR) .......................... 10-2020-0083645

(51) Int. Cl.
*G06T 11/60* (2006.01)
*G01T 1/20* (2006.01)
*G01T 1/29* (2006.01)

(52) U.S. Cl.
CPC ........ *G01T 1/2978* (2013.01); *G01T 1/20184* (2020.05); *G01T 1/20188* (2020.05); *G06T 11/60* (2013.01)

(58) Field of Classification Search
None
See application file for complete search history.

(56) References Cited

U.S. PATENT DOCUMENTS

| | | | |
|---|---|---|---|
| 2005/0207534 A1* | 9/2005 | Petrick | G01T 1/2985 378/114 |
| 2009/0134334 A1* | 5/2009 | Nelson | G01T 1/202 250/361 R |
| 2011/0168903 A1* | 7/2011 | Kyele | G01T 1/2914 250/371 |

FOREIGN PATENT DOCUMENTS

| | | |
|---|---|---|
| JP | 2014-502346 | 1/2014 |
| JP | 2015-087386 | 5/2015 |

(Continued)

OTHER PUBLICATIONS

ISA, Written Opinion of the International Searching Authority, Jun. 22, 2021 (Year: 2021).*

*Primary Examiner* — Eileen M Adams
(74) *Attorney, Agent, or Firm* — LEX IP MEISTER, PLLC

(57) ABSTRACT

Disclosed is a coded-aperture-based dual particle image fusion apparatus that simultaneously fuses a real-time site image of a radiation source and a reaction image of gamma rays and neutrons to perform nuclide discrimination through the position of radiation, dose per second, and spectrum information, to provide numerical information of dose, and to visualize position information of gamma rays and neutrons through GPS information, whereby it is possible to secure worker safety, and that has a compact size so as to be (Continued)

easily carried, whereby it is possible to create a radiation distribution map based on location movement.

8 Claims, 4 Drawing Sheets

(56) References Cited

FOREIGN PATENT DOCUMENTS

| | | | |
|---|---|---|---|
| KR | 10-1766294 | | 8/2017 |
| KR | 10-2049518 | | 11/2019 |
| KR | 10-2020-0061885 | * | 6/2020 |
| KR | 10-2182318 | | 11/2020 |

* cited by examiner

FIG. 2
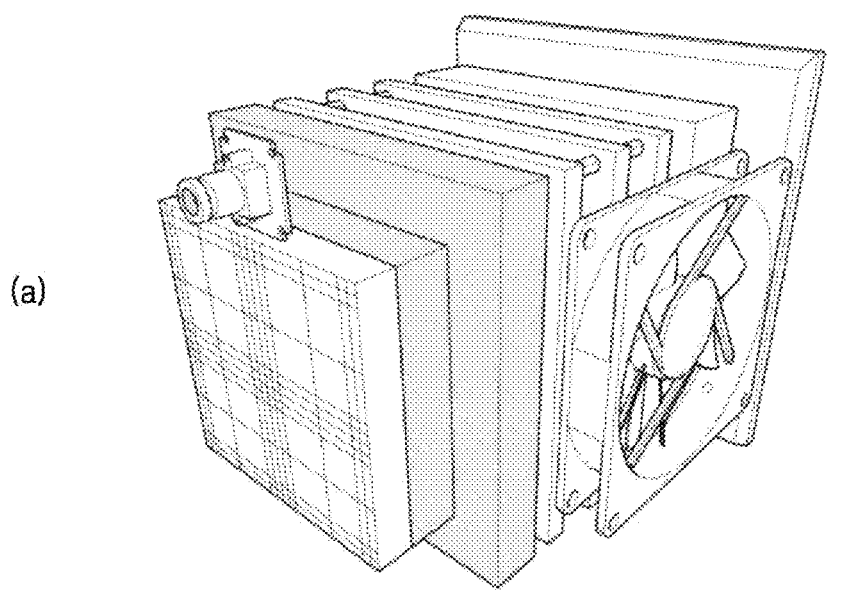
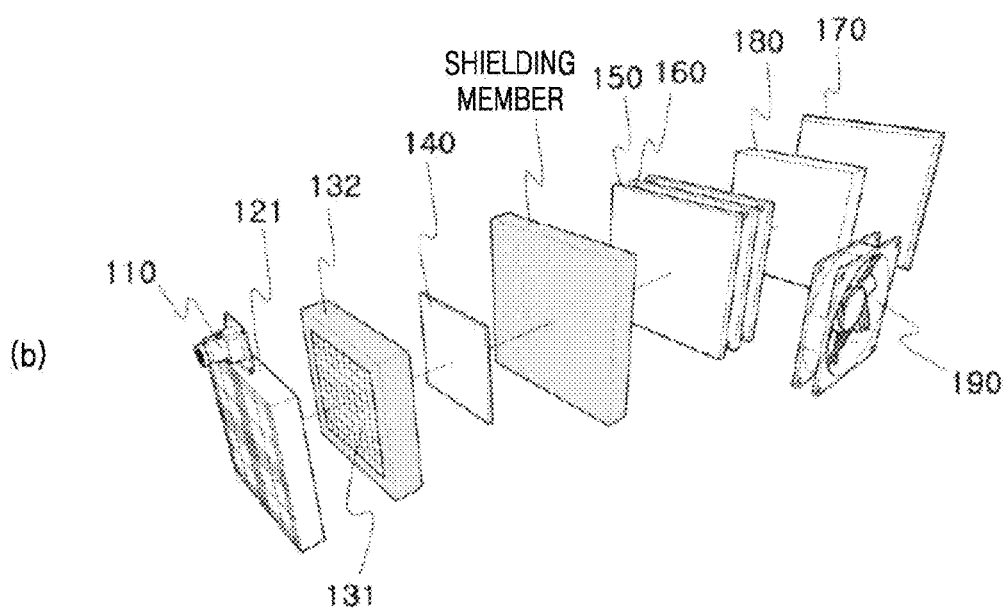

FIG. 4
(a)
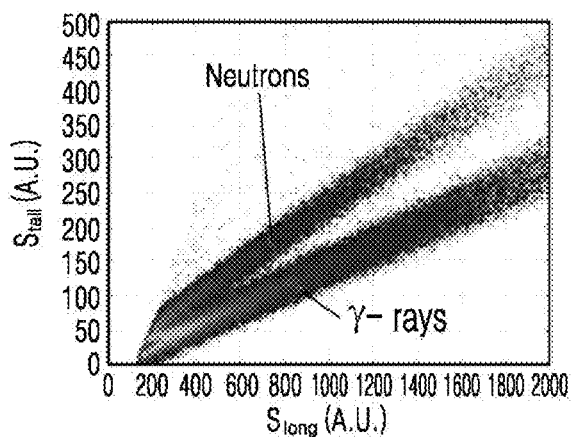
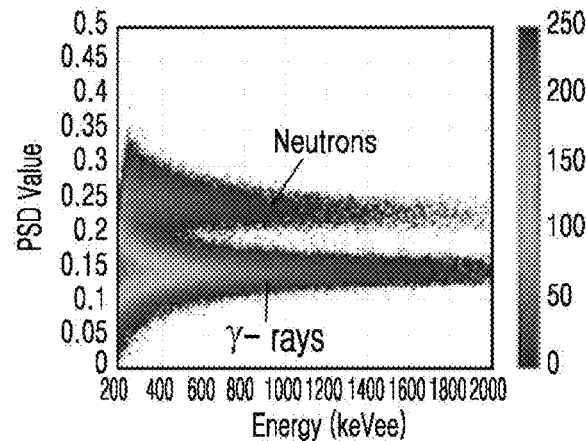
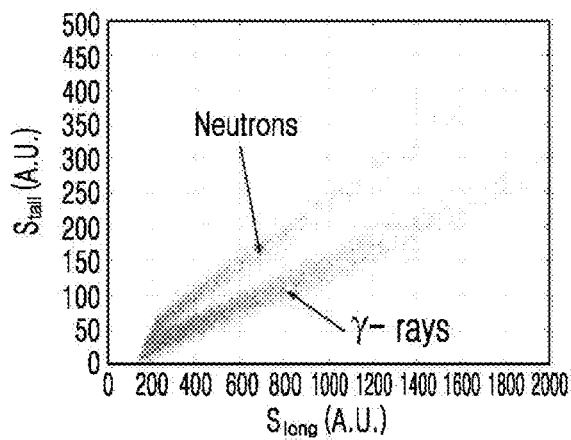
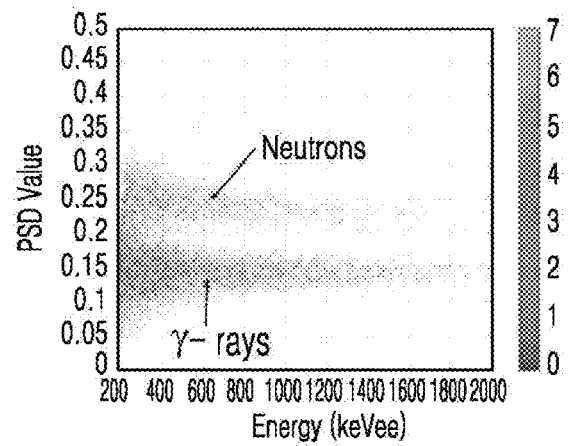
(b)
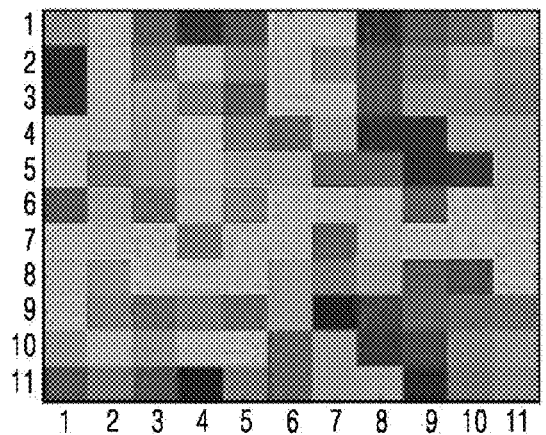
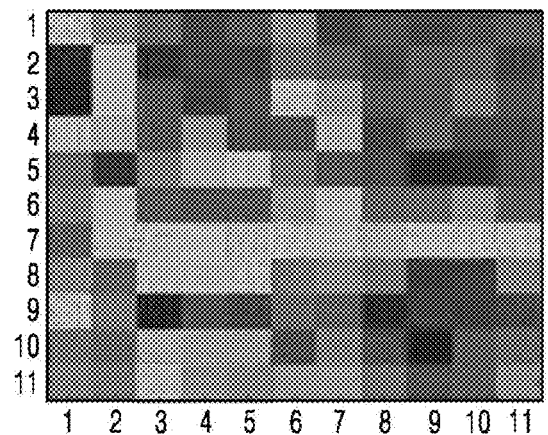

APPARATUS FOR FUSING DUAL PARTICLE IMAGES ON BASIS OF CODED APERTURE

TECHNICAL FIELD

The present invention relates to a coded-aperture-based dual particle image fusion apparatus, and more particularly to a coded-aperture-based dual particle image fusion apparatus that simultaneously fuses a real-time site image of a radiation source acquired through a CCD image sensor or a CMOS image sensor and a reaction image of gamma rays and neutrons to perform nuclide discrimination through the position of radiation, dose per second, and spectrum information, to provide numerical information of dose, and to visualize position information of gamma rays and neutrons through GPS information, whereby it is possible to secure worker safety, and that has a compact size so as to be easily carried, whereby it is possible to create a radiation distribution map based on location movement.

BACKGROUND ART

A special nuclear material includes materials, such as Pu-239, U-233, and U-235 concentrated by 20% or more, from which neutrons and gamma rays are mainly emitted. This material is used for beneficial purposes, such as power production, but can also be weaponized.

Since the special nuclear material must be stored and transported only for peaceful usage, active surveillance is required. For easy surveillance, imaging equipment capable of checking the location of a radiation source due to radioactivity is essential as surveillance equipment.

There is difficulty in shielding radiation emitted from most special nuclear materials, i.e. both neutrons and gamma rays. For this reason, imaging equipment using a Compton camera or coded aperture that mainly checks the location of a gamma ray source or equipment that modulates change of a signal over time to image the location of the radiation source has been used as conventional imaging equipment. In addition, for neutrons, image equipment using a neutron-scattering camera or a coded mask having a low atomic number has mainly been developed.

To date, imaging equipment that simultaneously discriminates between two particles, i.e. neutrons and gamma radiation sources, and performs location and nuclide analysis of each radiation source using information thereof mainly uses a neutron-scattering method; however, the imaging equipment is large, and therefore there is limitation in using the imaging equipment while moving the imaging equipment.

Therefore, there is a need to develop technology capable of discriminating between neutrons and gamma rays using a coded aperture to acquire a dual image and fusing the acquired image with a real-time image of the radiation source, thereby achieving visualization while minimizing the volume thereof so as to be easily carried.

DISCLOSURE

Technical Problem

The present invention has been made in view of the above problems, and it is an object of the present invention to provide a coded-aperture-based dual particle image fusion apparatus that simultaneously fuses a real-time site image of a radiation source acquired through a CCD image sensor or a CMOS image sensor and a reaction image of gamma rays and neutrons to perform nuclide discrimination through the position of radiation, dose per second, and spectrum information, to provide numerical information of dose, and to visualize position information of gamma rays and neutrons through GPS information, whereby it is possible to secure worker safety.

It is another object of the present invention to provide a coded-aperture-based dual particle image fusion apparatus that has a compact size so as to be easily carried, whereby it is possible to create a radiation distribution map based on location movement.

Technical Solution

A coded-aperture-based dual particle image fusion apparatus according to an embodiment of the present invention includes an optical camera configured to photograph the site of a radiation source in order to acquire a site image, a coded aperture configured to allow radiation emitted from the radiation source to be incident thereupon, a coded pattern being applied to the coded aperture, a scintillator array having a structure in which pixels are arranged in an N×N matrix, the scintillator array being configured to generate a scintillation signal for gamma rays and neutrons from the radiation incident through the coded aperture, an optical sensor array having a structure in which pixels are arranged in an N×N matrix, the optical sensor array being configured to acquire an electrical signal for the scintillation signal generated through the scintillator array, a signal processing unit configured to discriminate between reaction positions of the gamma rays and the neutrons and reaction signals for reaction size based on the electrical signal, an image fusion unit configured to record a reaction image of each of the gamma rays and the neutrons based on the reaction signal and to fuse the site image and the reaction image in order to acquire a fused image, and a display configured to output the fused image.

In an embodiment, the optical camera may be a CCD or CMOS image sensor.

In an embodiment, the coded-aperture-based dual particle image fusion apparatus according to present invention may further include a battery configured to supply power and a cooling fan configured to discharge heat generated from the coded-aperture-based dual particle image fusion apparatus outside.

In an embodiment, any one of a mosaicked pattern, a centered mosaic pattern, and an antisymmetric MURA pattern may be applied to the coded aperture.

In an embodiment, the scintillator array may include a scintillator body formed by an array of one or more pixels and a shielding member configured to shield upper and lower side surfaces and left and right side surfaces of the scintillator body, the shielding member being made of tungsten, and the scintillator body and the optical sensor array may be received inside the shielding member, whereby the upper and lower side surfaces and the left and right side surfaces of the scintillator body and lower side surfaces and left and right side surfaces of the optical sensor array may be shielded.

In an embodiment, any one of a plastic scintillator, a stilbene (1,2-diphenylethylene, C14H12) scintillator, a CLYC (Cs2LiYCl6:Ce) scintillator, and an organic glass scintillator, to each of which pulse-shape discrimination (PSD) is applied, may be employed as the scintillator body.

In an embodiment, the optical sensor array may be a semiconductor optical sensor corresponding to a silicon photomultiplier (SiPM) or a pixel type position sensitive photomultiplier tube (PSPMT).

In an embodiment, the coded-aperture-based dual particle image fusion apparatus according to present invention may further include a GPS configured to provide real-time location information of the radiation source.

In an embodiment, the shielding member made of tungsten may be provided between the optical sensor array and the signal processing unit, whereby background radiation emitted in a direction from the rear of the signal processing unit to the optical sensor array may be shielded.

Advantageous Effects

According to an aspect of the present invention, the present invention has an advantage in that it is possible to fuse a real-time site image of a radiation source acquired through a CCD image sensor or a CMOS image sensor and a reaction image of gamma rays and neutrons, whereby it is possible to visualize position information of gamma rays and neutrons, and therefore it is possible to secure worker safety.

In addition, according to an aspect of the present invention, the present invention has an advantage in that the coded-aperture-based dual particle image fusion apparatus has a compact size so as to be easily carried, whereby it is possible to create a radiation distribution map based on location movement.

In addition, according to an aspect of the present invention, there is an advantage in that a small amount of data is used, whereby rapid image processing is possible.

DESCRIPTION OF DRAWINGS

FIG. 2 is a view showing the form of the coded-aperture-based dual particle image fusion apparatus 100 shown in FIG. 1.

FIG. 4 is a view showing spectra in which gamma rays and neutrons are separated from each other by applying pulse-shape discrimination to the graph shown in FIG. 3.

BEST MODE

Hereinafter, a preferred embodiment will be presented in order to assist in understanding the present invention. However, the following embodiment is merely provided such that the present invention can be more easily understood, and the details of the present invention are not limited by the embodiment.

Figure 1:
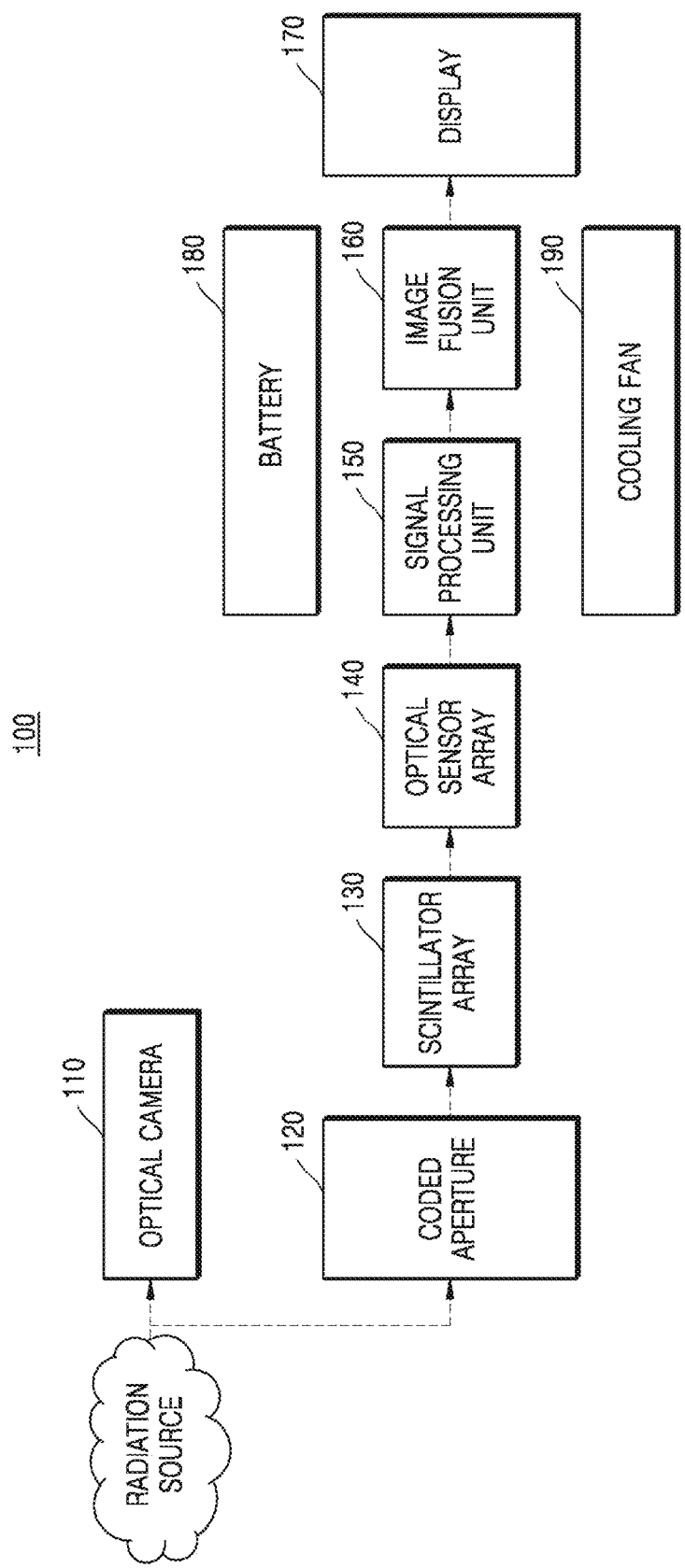
FIG. 1 is a view schematically showing the construction of a coded-aperture-based dual particle image fusion apparatus 100 according to an embodiment of the present invention.

FIG. 1 is a view schematically showing the construction of a coded-aperture-based dual particle image fusion apparatus 100 according to an embodiment of the present invention, and FIG. 2 is a view showing the form of the coded-aperture-based dual particle image fusion apparatus 100 shown in FIG. 1.

Referring to FIGS. 1 and 2, the coded-aperture-based dual particle image fusion apparatus 100 according to the embodiment of the present invention generally includes an optical camera 110, a coded aperture 120, a scintillator array 130, an optical sensor array 140, a signal processing unit 150, an image fusion unit 160, and a display 170. Also, in an additional embodiment, the coded-aperture-based dual particle image fusion apparatus may further include a battery 180, a cooling fan 190, and a GPS (not shown) configured to provide real-time location information of a radiation source.

First, optical the camera 110 serves to photograph the site of the radiation source using a CCD or CMOS image sensor in order to acquire a site image. The optical camera 110 photographs an image to be fused with an image of gamma rays and neutrons from which the reaction position of a radiation material is processed as an image through operation program software of the image fusion unit 160, a description of which will follow, and adjustment thereof is performed such that image implementation is possible in low light.

The coded aperture 120 allows radiation emitted from the radiation source to be incident thereupon, and a coded pattern is applied thereto.

The coded aperture 120, which is a mechanical focusing device configured to block the introduction of high-energy radiation in an undesired direction, is made of tungsten. The coded aperture 120 is manufactured in the form of a coded pattern mask so as to react with the scintillator array 130, a description of which will follow. At this time, a MURA pattern is applied as the coded pattern.

Any one of a mosaicked pattern, a centered mosaic pattern, and an antisymmetric MURA pattern may be applied as the mask pattern of the coded aperture 120, and this structure has an advantage in that it is possible to reconfigure a real-time radiation incidence image at once even without an additional process of the mask pattern (e.g. rotation of the mask pattern).

In the pattern structure of the mask pattern, a pair of pattern regions disposed in a diagonal region based on a central part thereof is disposed so as to be symmetrical with respect to each other, wherein, based on two imaginary diagonal lines passing through the central point of the central part region, region patterns disposed on the imaginary diagonal lines are disposed so as to be symmetrical with respect to each other in the central part region.

This disposition structure has an advantage in that it is possible to accurately extract image information due to pattern symmetry without photographing twice or more and to implement the same image without rotation of the mask, whereby it is possible to increase a signal-to-noise ratio (to remove noise).

The scintillator array 130, which has a structure in which pixels are arranged in an N×N matrix, serves to generate a scintillation signal for gamma rays and neutrons from the radiation incident through the coded aperture 120.

More specifically, the scintillator array 130 includes a scintillator body 131 configured to react with gamma rays and neutrons that have passed through the coded aperture 120 in order to generate a scintillation signal of microlight, the scintillator body being formed by an array of one or more pixels, and a quadrangular-ring-shaped shielding member 132 configured to shield upper and lower side surfaces and left and right side surfaces of the scintillator body 131, the shielding member being made of tungsten, wherein the fact that energy regions of reaction energy spectra with neutrons and gamma rays are different from each other is used.

A plastic scintillator, a stilbene (1,2-diphenylethylene, $C_{14}H_{12}$) scintillator, a CLYC ($Cs_2LiYCl_6$:Ce) scintillator, or an organic glass scintillator, to which pulse-shape discrimination (PSD) is applied, may be employed as the scintillator body 131.

In particular, when an inorganic scintillator alone is used as the scintillator body 131, it is possible to acquire a gamma-ray image. When the above scintillator, from which pulse-shape discrimination (PSD) is possible, is applied, however, there is also an advantage in that it is also possible to acquire dissimilar images in which neutrons and gamma rays are separated from each other.

The optical sensor array 140, which has a structure in which pixels are arranged in an N×N matrix, serves to acquire an electrical signal for the scintillation signal generated through the scintillator array 130.

More specifically, the optical sensor array 140 serves to convert a scintillation signal converted into light by the scintillator array 130 into a micro electrical signal depending on the amount of the light. At this time, an array type semiconductor optical sensor corresponding to a silicon photomultiplier (SiPM) or a pixel type position sensitive photomultiplier tube (PSPMT) may be applied as the optical sensor array 140. In particular, for the SiPM, one-to-one coupling with a small scintillator having a sectional area of a few mm$^2$ is possible, whereby there is an advantage in that it is possible to maximize light receiving performance to collect light emitted from the scintillator array 130. In addition, the optical sensor array 140 may be received in the shielding member 132 included in the scintillator array 130, whereby upper and lower side surfaces and left and right side surfaces of the optical sensor array may be shielded from radiation in the same manner as the scintillator body 131.

The signal processing unit 150 serves to discriminate between reaction positions of gamma rays and neutrons and reaction signals about reaction size based on the electrical signal acquired through the optical sensor array 140. The signal processing unit 150 extracts the size, position, and PSD value of a signal for each pixel acquired through the optical sensor array 140. This process will be described with reference to FIGS. 3 and 4.

Figure 3:
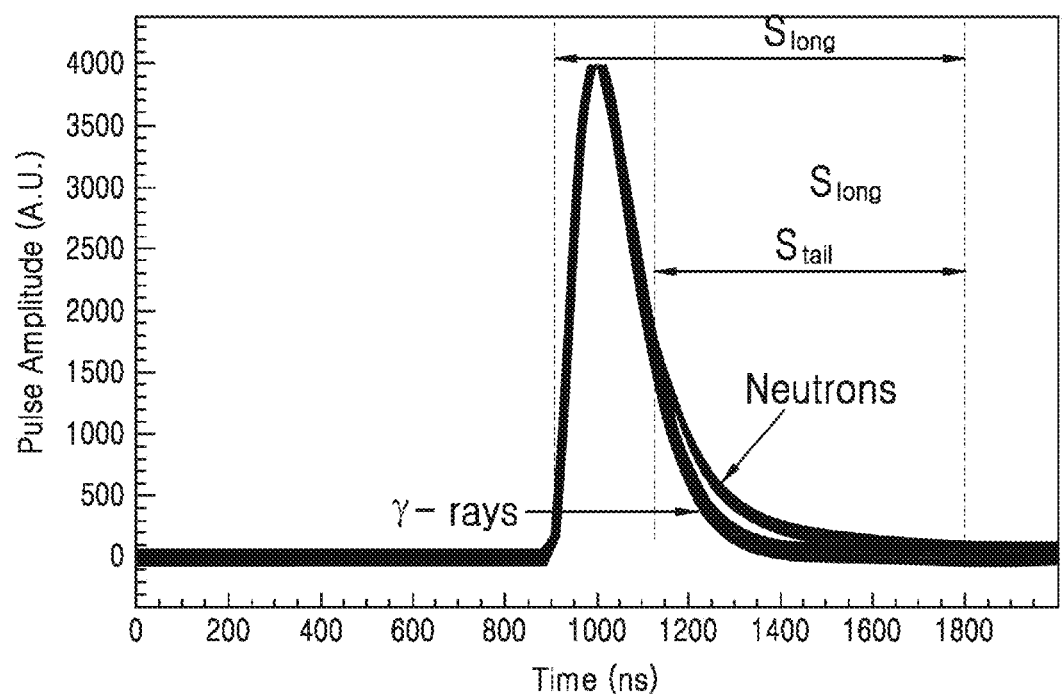
FIG. 3 is a view showing scintillation pulses of gamma rays and neutrons observed using the coded-aperture-based dual particle image fusion apparatus 100 shown in FIG. 1 in the form of a graph.

FIG. 3 is a view showing scintillation pulses of gamma rays and neutrons observed using the coded-aperture-based dual particle image fusion apparatus 100 shown in FIG. 1 in the form of a graph, and FIG. 4 is a view showing spectra in which gamma rays and neutrons are separated from each other by applying pulse-shape discrimination to the graph shown in FIG. 3.

Referring to FIGS. 3 and 4, FIG. 3 shows time-specific pulse amplitude of gamma rays and neutrons acquired from a total of N×N pixels in the form of a graph. At this time, when pulse-shape discrimination is applied to each of gamma rays and neutrons to acquire a PSD value, energy spectra are derived, as shown in FIG. 4($a$). Response at each pixel is sought, and a threshold value of the PSD value is applied. When the value is equal to or greater than 0.2, the value is considered to be neutrons. When the value is less than 0.2, the value is considered to be gamma rays. Subsequently, data at each pixel are stored in a state of discriminating between neutron information and gamma ray information.

The image fusion unit 160 serves to record a reaction image of each of the gamma rays and the neutrons based on the reaction signal of the signal processing unit 150 and to fuse the reaction image of each of gamma rays and neutrons and the site image of the radiation source acquired through the optical camera 110 to acquire a fused image.

At this time, the image fusion unit 160 corresponds to a kind of computer having stored therein programmed software that acquires, stores, and analyzes gamma ray image data and neutron image data, that acquires, stores, and analyzes gamma ray and neutron spectra, that acquires, stores, and analyzes time-specific information and radiation-dose-specific information, and that calculates reaction positions of gamma rays and neutrons so as to be edited as an image using a software program.

The site image may be reconfigured in real time, and an iterative image reconfiguration algorithm, such as MLEM or compressed-sensing, is used as an algorithm for reconfiguration. A system function necessary for this is manufactured using simulation code, such as MCNP or GEANT4, or a system function sought by applying mathematical modeling is used. At this time, in order to reconfigure the image in real time, a minimum number of iterations and reconfiguration time are used, and previous information must be initialized. The reconfiguration time means the minimum time within which at least 100 pieces of information can be obtained.

Meanwhile, the image fusion unit 160 generally fuses the gamma ray image and the neutron image with the site image using the following two methods.

An integration mode, in which a total detection time is set and all signals detected during the time are used, is used as the first method, and a real-time mode, in which accumulation is performed only during the time during which the total number of detected signals becomes 3000 using count rate information of a GUI and detector map information at that time is used for the above-mentioned image reconfiguration technique, is used as the second method.

For example, it is possible to reconfigure the image of the radiation source with only 3000 detected signals using the image reconfiguration technique. If the count rate from the radiation source is 300 counts per second (cps), events are recorded for 10 seconds, the map of the detector is created, and then the image is reconfigured. At this time, an indicator indicating a progress of 100% may be displayed on the GUI, whereby it is possible to predict when the radiation image will be displayed.

Referring back to FIGS. 1 and 2, the display 170 serves to output image data processed through the image fusion unit 160, energy spectra, the count rate, and the temperature value. At this time, in the present invention, real-time location information of the radiation source is acquired through the GPS and is output through the display 170 as a screen.

Also, in the present invention, power may be supplied to the coded-aperture-based dual particle image fusion apparatus 100 through the battery 180. At this time, a secondary battery, which is capable of being charged, may be applied as the battery 180. In another embodiment, the battery 180 may be connected to an external power cable in order to directly receive power.

Also, in the present invention, the cooling fan 190 may be provided to dissipate heat generated during data processing performed by the signal processing unit 150 and the image fusion unit 160 for cooling.

In addition, the shielding member, which is made of tungsten, is provided between the optical sensor array 140 and the signal processing unit 150, whereby it is possible to shield background radiation emitted in a direction from the rear of the signal processing unit 150 to the optical sensor array 140, and therefore there is an advantage in that more accurate data acquisition is possible.

As is apparent from the above description, in the present invention, nuclide discrimination is performed through the position of radiation fused with the actual site image, dose per second, d spectrum information, and information such as the site location through GPS information is visualized through the above construction of the present invention, whereby it is possible to secure worker safety, and the coded-aperture-based dual particle image fusion apparatus is easily carried, whereby it is possible to create a radiation distribution map based on location movement.

Although a description was given with reference to the preferred embodiment of the present invention in the above, those skilled in the art will understand that the present invention can be variously modified and changed without departing from the idea and category of the present invention defined by the appended claims.

The invention claimed is:

1. A coded-aperture-based dual particle image fusion apparatus comprising:
    an optical camera configured to photograph a site of a radiation source in order to acquire a site image;
    a coded aperture configured to allow radiation emitted from the radiation source to be incident thereupon, a coded pattern being applied to the coded aperture;
    a scintillator array having a structure in which pixels are arranged in an N×N matrix, the scintillator array being configured to generate a scintillation signal for gamma rays and neutrons from the radiation incident through the coded aperture;
    an optical sensor array having a structure in which pixels are arranged in an N×N matrix, the optical sensor array being configured to acquire an electrical signal for the scintillation signal generated through the scintillator array;
    a signal processing unit configured to discriminate between reaction positions of the gamma rays and the neutrons and reaction signals for reaction size based on the electrical signal;
    an image fusion unit configured to record a reaction image of each of the gamma rays and the neutrons based on the reaction signal and to fuse the site image and the reaction image in order to acquire a fused image; and
    a display configured to output the fused image,
    wherein
    the scintillator array comprises:
    a scintillator body formed by an array of one or more pixels; and
    a shielding member configured to shield upper and lower side surfaces and left and right side surfaces of the scintillator body, the shielding member being made of tungsten, and
    the scintillator body and the optical sensor array are received inside the shielding member, whereby the upper and lower side surfaces and the left and right side surfaces of the scintillator body and lower side surfaces and left and right side surfaces of the optical sensor array are shielded.

2. The coded-aperture-based dual particle image fusion apparatus according to claim 1, wherein the optical camera is a CCD or CMOS image sensor.

3. The coded-aperture-based dual particle image fusion apparatus according to claim 1, further comprising:
    a battery configured to supply power; and
    a cooling fan configured to discharge heat generated from the coded-aperture-based dual particle image fusion apparatus outside.

4. The coded-aperture-based dual particle image fusion apparatus according to claim 1, wherein any one of a mosaicked pattern, a centered mosaic pattern, and an anti-symmetric MURA pattern is applied to the coded aperture.

5. The coded-aperture-based dual particle image fusion apparatus according to claim 1, wherein any one of a plastic scintillator, a stilbene (1,2-diphenylethylene, C14H12) scintillator, a CLYC (Cs2LiYCl6:Ce) scintillator, and an organic glass scintillator, to each of which pulse-shape discrimination (PSD) is applied, is employed as the scintillator body.

6. The coded-aperture-based dual particle image fusion apparatus according to claim 1, wherein the optical sensor array is a semiconductor optical sensor corresponding to a silicon photomultiplier (SiPM) or a pixel type position sensitive photomultiplier tube (PSPMT).

7. The coded-aperture-based dual particle image fusion apparatus according to claim 1, further comprising a GPS configured to provide real-time location information of the radiation source.

8. A coded-aperture-based dual particle image fusion apparatus comprising:
    an optical camera configured to photograph a site of a radiation source in order to acquire a site image;
    a coded aperture configured to allow radiation emitted from the radiation source to be incident thereupon, a coded pattern being applied to the coded aperture;
    a scintillator array having a structure in which pixels are arranged in an N×N matrix, the scintillator array being configured to generate a scintillation signal for gamma rays and neutrons from the radiation incident through the coded aperture;
    an optical sensor array having a structure in which pixels are arranged in an N×N matrix, the optical sensor array being configured to acquire an electrical signal for the scintillation signal generated through the scintillator array;
    a signal processing unit configured to discriminate between reaction positions of the gamma rays and the neutrons and reaction signals for reaction size based on the electrical signal;
    an image fusion unit configured to record a reaction image of each of the gamma rays and the neutrons based on the reaction signal and to fuse the site image and the reaction image in order to acquire a fused image; and
    a display configured to output the fused image,
    wherein a shielding member made of tungsten is provided between the optical sensor array and the signal processing unit, whereby background radiation emitted in a direction from a rear of the signal processing unit to the optical sensor array is shielded.

* * * * *